(12) United States Patent
Matthijssen et al.

(10) Patent No.: US 10,551,255 B2
(45) Date of Patent: Feb. 4, 2020

(54) OPTICAL SENSOR DEVICE, SENSOR APPARATUS AND CABLE

(71) Applicant: Fugro Technology B.V., Leidschendam (NL)

(72) Inventors: Martijn Matthijssen, Arnhem (NL); Bastiaan Meulblok, The Hague (NL); German Enrique Knoppers, The Hague (NL); Devrez Mehmet Karabacak, Leidschendam (NL)

(73) Assignee: Fugro Technology B.V. (NL)

( * ) Notice: Subject to any disclaimer, the term of this patent is extended or adjusted under 35 U.S.C. 154(b) by 258 days.

(21) Appl. No.: 15/572,594

(22) PCT Filed: May 8, 2015

(86) PCT No.: PCT/NL2015/050317
§ 371 (c)(1),
(2) Date: Nov. 8, 2017

(87) PCT Pub. No.: WO2016/182428
PCT Pub. Date: Nov. 17, 2016

(65) Prior Publication Data
US 2018/0149532 A1    May 31, 2018

(51) Int. Cl.
*G01L 1/24* (2006.01)
*G01H 9/00* (2006.01)
(Continued)

(52) U.S. Cl.
CPC .......... *G01L 1/246* (2013.01); *G01D 5/35316* (2013.01); *G01H 9/004* (2013.01);
(Continued)

(58) Field of Classification Search
CPC .............................. G01L 1/246; G01D 5/35316
See application file for complete search history.

(56) References Cited

U.S. PATENT DOCUMENTS 2,681,566 A    6/1954   Ruge
4,567,771 A    2/1986   Nelson et al.
(Continued)

FOREIGN PATENT DOCUMENTS

CN    1448740 A     10/2003
CN    103017972 A    4/2013
(Continued)

OTHER PUBLICATIONS

Office Action; Japanese Application No. 2017-558438; dated Jan. 31, 2019.
(Continued)

*Primary Examiner* — Sung H Pak
*Assistant Examiner* — Hoang Q Tran
(74) *Attorney, Agent, or Firm* — Polsinelli PC

(57) ABSTRACT

The invention relates to an optical sensor device comprising a reference body and at least one sensing transducer. The sensing transducer is arranged for receiving an input action, and is movably arranged relative to the reference body for moving relative to the reference body in response to the input action. The device further comprises an optical fiber and one or more transmission arms including a first transmission arm. The optical fiber comprises an intrinsic fiber optic sensor. The optical fiber is connected with a first connecting part thereof to the first transmission arm and with a second connecting part thereof to an element exterior to said first transmission arm. The first connecting part and the second connecting part are on either side of the intrinsic fiber optic sensor. For receiving the input action, a base of the first transmission arm is connected at a first part thereof with the reference body and with a second part thereof with the sensing transducer. The optical fiber is connected at a location along the first transmission arm remote from the base thereby converting the input action received by the
(Continued)

sensing transducer into a sensing action applied to the optical fiber such as to modify strain in the optical fiber dependent on said input action.

20 Claims, 7 Drawing Sheets

(51) Int. Cl.
   *G01P 15/093* (2006.01)
   *G01P 15/18* (2013.01)
   *G01D 5/353* (2006.01)
   *G01L 5/00* (2006.01)
   *G01P 15/08* (2006.01)

(52) U.S. Cl.
   CPC .......... *G01L 5/0033* (2013.01); *G01P 15/093* (2013.01); *G01P 15/18* (2013.01); *G01P 2015/0828* (2013.01); *G01P 2015/0837* (2013.01)

(56) References Cited

U.S. PATENT DOCUMENTS

| | | | |
|---|---|---|---|
| 6,024,344 | A | 2/2000 | Buckley et al. |
| 6,175,108 | B1 * | 1/2001 | Jones ................ G01P 15/18 250/227.14 |
| 6,474,254 | B1 | 11/2002 | Ambs et al. |
| 6,807,325 | B1 | 10/2004 | Kraemmer et al. |
| 6,955,085 | B2 | 10/2005 | Jones et al. |
| 7,310,287 | B2 | 12/2007 | Ray et al. |
| 7,366,055 | B2 | 4/2008 | Ronnekleiv et al. |
| 7,539,080 | B2 | 5/2009 | Ronnekleiv et al. |
| 7,679,994 | B2 | 3/2010 | Ronnekleiv et al. |
| 7,688,673 | B2 | 3/2010 | Ronnekleiv et al. |
| 8,226,328 | B2 | 7/2012 | Thompson et al. |
| 8,675,446 | B2 | 3/2014 | Gateman et al. |
| 2006/0227656 | A1 | 10/2006 | Berg et al. |
| 2007/0258319 | A1 | 11/2007 | Ronnekleiv et al. |
| 2009/0185773 | A1 | 7/2009 | Lee |
| 2012/0263540 | A1 | 10/2012 | Berg |
| 2013/0058192 | A1 | 3/2013 | Gateman et al. |

FOREIGN PATENT DOCUMENTS

| | | |
|---|---|---|
| DE | 19939583 A1 | 9/2000 |
| DE | 102013101432 A1 | 8/2014 |
| EP | 1124112 A2 | 8/2001 |
| EP | 0958511 B1 | 8/2008 |
| JP | 2000230935 A | 8/2000 |
| JP | 2003214907 A | 7/2003 |
| JP | 2013526703 A | 6/2013 |
| KR | 101057309 B1 | 8/2011 |
| WO | 9106877 A1 | 5/1991 |
| WO | 03048809 A2 | 6/2003 |
| WO | 03048819 A2 | 6/2003 |
| WO | 2008042556 A2 | 4/2008 |
| WO | 2011141445 A1 | 11/2011 |
| WO | 2013131197 A1 | 9/2013 |
| WO | 2013175010 A2 | 11/2013 |

OTHER PUBLICATIONS

English abstract of JP2000230935; retrieved from www.espacenet.com on Feb. 12, 2019.
English abstract of JP2003214907; retrieved from www.espacenet.com on Feb. 12, 2019.
English abstract of JP2013526703; retrieved from www.espacenet.com on Feb. 12, 2019.
International Search Report and Written Opinion; PCT Application No. PCT/NL2015/050317; dated Jan. 28, 2016.
English abstract of DE102013101432; retrieved from www.espacenet.com on Nov. 6, 2017.
English Abstract of DE19939583; retrieved from www.espacenet.com on Feb. 8, 2018.
English Abstract of KR101057309; retrieved from www.espacenet.com on Feb. 8, 2018.
English Abstract of CN103017972; retrieved from www.espacenet.com on Feb. 8, 2018.
English Abstract of CN1448740; retrieved from www.espacenet.com on Feb. 8, 2018.

* cited by examiner

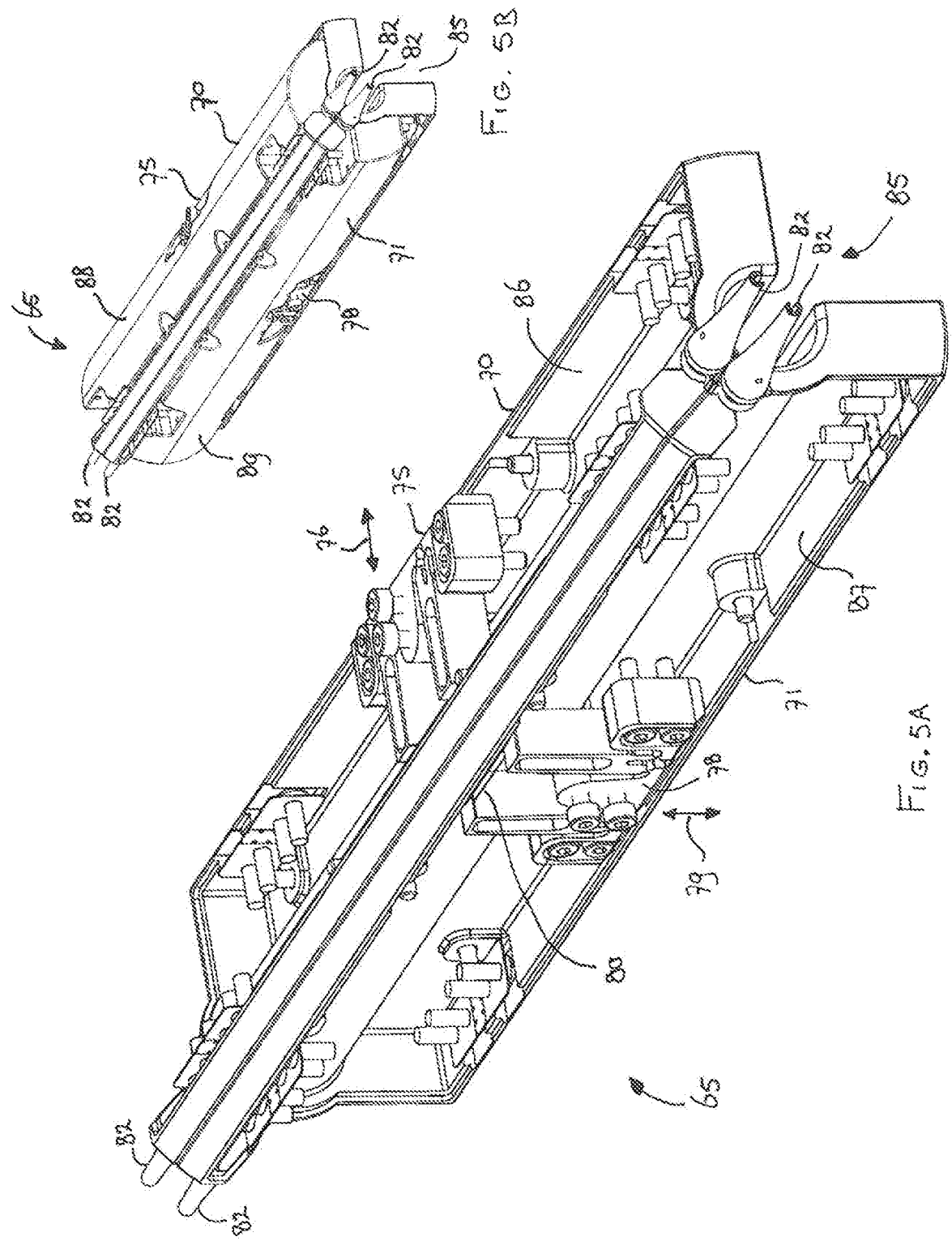

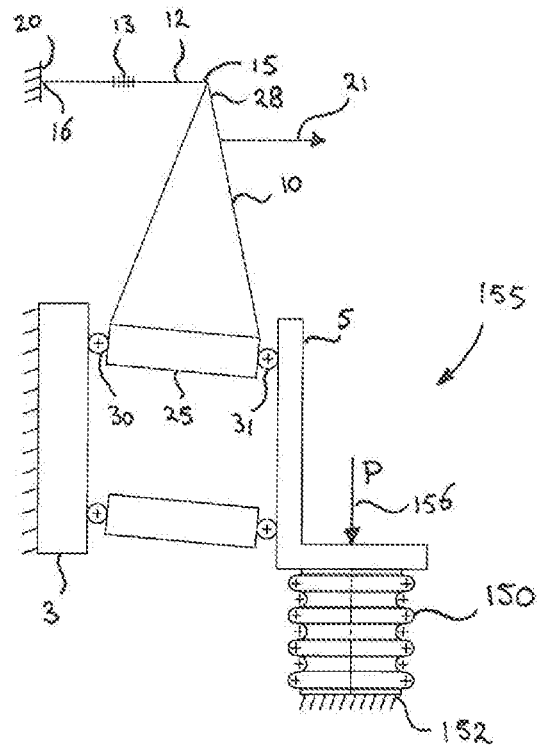
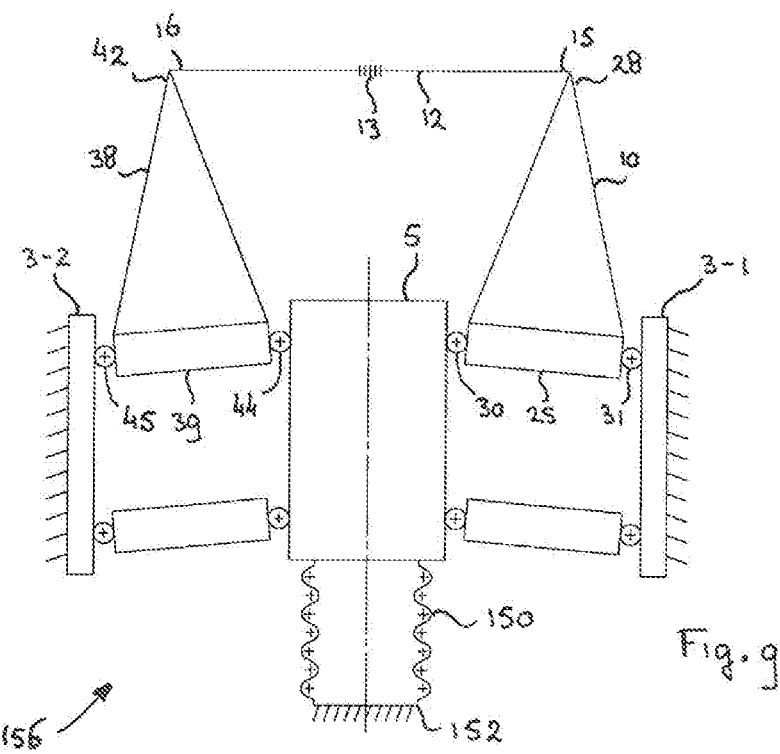

OPTICAL SENSOR DEVICE, SENSOR APPARATUS AND CABLE

CROSS-REFERENCE TO RELATED APPLICATIONS

This application is a national stage application of International Application No. PCT/NL2015/050317, which was filed on May 8, 2015, of which is incorporated by reference in its entirety.

FIELD OF THE INVENTION

The present invention relates to an optical sensor device, in particular an optical sensor device applying an intrinsic fiber optic sensor.

BACKGROUND

A known class of optical sensors for various applications includes the use of intrinsic fiber optic sensors. An intrinsic fiber optic sensor is a sensor that uses an optical fiber as the sensing element. In many applications the intrinsic fiber optic sensor is lit (e.g. by a laser), and a change in the fiber due to an external cause (dependent on the type of sensor) results in a measurable change in the optical signal transmitted by or received from the sensor. A typical example of an intrinsic fiber optic sensor is a Fiber Bragg Grating (FBG).

An FBG comprises a fiber having a core including therein, over a certain distance, a periodic variation of the refractive index. This periodic variation forms a wavelength-specific dielectric mirror, wherein light in a specific (narrow) range around and including a certain wavelength is reflected. The wavelength reflected is determined by the periodicity of the refractive index of the core. The FBG is based on the principle that a difference in strain of the optical fiber causes the geometric periodicity of the variations to change. This results in a change of the reflected wavelength, which change can be detected (e.g. by spectral analysis, or using an interferometer).

Fiber Bragg Gratings are applied in many applications for measuring a wide range of parameters and characteristics, including static and dynamic parameters. For example, a FBG may be applied in a pressure sensor by converting an exerted exterior pressure into a variable force applied to the fiber including the FBG. Another application, usable for example to perform geological survey, is the application of a FBG in an accelerometer e.g. for measuring soil vibrations. Such sensors are advantageously applied for example in the oil and gas industry.

For many of these applications, it is required that the size of the optical sensor device is small, for example to enable implementation in a cable that maybe useable for exploration and geological survey at land, at sea or in a borehole, or to measure vibrations in a building, a bridge or other construction. However, achieving the desired size reduction often comes at the cost of sensitivity of the sensor, and this trade-off is usually not desired. Moreover, sensitivity and size are not the only characteristics that are of interest. In particular for dynamic sensors, a broad dynamic operational frequency range is desired. An upper limit of this operational frequency range is determined by the resonance frequency of the sensor device. Even for static sensors, fast and accurate response to variations is often required. Matching all these requirements in an optical fiber design is complex because they are related to each other, and meeting one requirement often deteriorates the design for another requirement.

SUMMARY OF THE INVENTION

It is an object of the present invention to provide a small sized optical sensor device design for easy implementation, which is highly sensitive across a broad operational frequency range.

To this end, there is provided herewith an optical sensor device comprising a reference body and at least one sensing transducer. The sensing transducer is arranged for receiving an input action, and is movably arranged relative to the reference body for moving relative to the reference body in response to the input action. The device further comprises an optical fiber and one or more transmission arms including a first transmission arm. The optical fiber comprises an intrinsic fiber optic sensor. The optical fiber is connected with a first connecting part thereof to the first transmission arm and with a second connecting part thereof to an element exterior to said first transmission arm. The first connecting part and the second connecting part are on either side of the intrinsic fiber optic sensor. For receiving the input action, a base of the first transmission arm is connected at a first part thereof with the reference body and with a second part thereof with the sensing transducer. The optical fiber is connected at a location along the first transmission arm remote from the base thereby converting the input action received by the sensing transducer into a sensing action applied to the optical fiber such as to modify strain in the optical fiber dependent on said input action.

The term 'base', in this respect, is to be understood as indicating a first end part of the respective transmission arm, including the end face or end faces transverse to the longitudinal axis through the transmission arm. In case of an angled or bended transmission arm which does not have a single longitudinal direction along its length, such an end face or end faces relate to those faces that form the closing faces of the transmission arm, and that are not parallel to the local direction of the axis following the length of the transmission arm.

The optical sensor device of the present invention includes a transmission arm to convert an input action (e.g. a vibration or a pressure variation) into a sensor action applied to the intrinsic fiber optic sensor (e.g. FBG, fiber laser, multicore fiber). Transmission arms allow tuning of the achievable operational frequency range and sensitivity in dynamic sensors, whereby the pivotable transmission arm either amplifies the sensitivity or increases the operational frequency range depending on the arrangement. However, sensor design becomes challenging when taking also the size requirements into consideration. In particular where the transmission ratio T (the ratio between arm lengths from the input and output to the pivot point on the arm) of the transmission arm deviates further from unity (e.g. T>>1 or T<<1), rigidity of the arm and rotational inertia significantly contribute to lowering resonance frequency and operational bandwidth. Additionally, the loss of rigidity in the arm results directly in a loss of transmission efficiency and thus loss of sensitivity and signal in the sensor system. Furthermore, material properties and manufacturing issues limit the attainable rigidity in small form factor which is highly desirable for integrated sensors.

Advantageously, the optical sensor device of the present invention allows for a compact design. At the same time, both amplification of the input action for exerting a force on the fiber can be maximized while the system's rotational inertia is kept small. The transmission ratio of the arm equals T=L1/L2, wherein L1 is the distance between the first and second part of the base that connect the arm to the reference body and to the sensing transducer respectively. Length L2 is the arm length between the pivot point at the base—i.e. this is the first part at the base which connects to the reference body—and the connection with the fiber. Amplification of the received input action is determined by the transmission ratio T. Low inertia of the transmission arm is obtained by the compactness of the arm.

The forces resulting from motion of the sensing transducer relative to the reference body are conveyed into the transmission arm via the connection at the base. The connecting first and second part of the base, connecting respectively to the reference body and the sensing transducer, are arranged close to each other (making distance L1 small). The base of the arm has mechanical stiffness resulting from the longitudinal shape of the arm, and is therefore robust. This is advantageous with respect to rigidity at the input. Across its length, the arm can be fully optimized in terms of rotational inertia and rigidity with respect to the forces applied at the optical fiber connection. Moreover, the close proximity of the connections at the base (the first and second part), allows the arm to be smaller in length for obtaining a same transmission ratio T. This further contributes to lowering the inertia of the system.

The moment of inertia of the system determines the extent in which it provides resistance against a rotational motion. Therefore, the optical sensor device of the present invention provides an optimal design wherein input action is amplified well into variations in strain in the FBG, while allowing fast response of the device to fast changes in the input action. In terms of sensing dynamic parameters, a lower rotational inertia results in the resonance frequency of the system to shift to higher frequencies. Hence, because the upper limit of the operational frequency range of the device is determined by the resonance frequency (the upper limit must be well below the resonance frequency), the low inertia design of the present invention provides an optical sensor device having a broad operational frequency range. The sensor device is thus responsive to high frequencies.

Even for static and semi-static parameters, the optical sensor device of the present invention provides advantages. This is not only due to its compact design, but also because as a result of the low inertia of the system, the optical sensor device responds well to sudden fast changes in the parameter sensed (e.g. sudden pressure changes where the sensor is applied in a pressure sensor). Such fast changes can be followed well by the sensor. This for example allows the optical sensor device to be used at a higher sampling rate, allowing to obtain more sensor readings in a same amount of time. Hence, this increases the accuracy by obtaining improved measurement statistics in addition to allowing detection of fast changes.

A further advantage of the present invention, wherein the base of the at least one transmission arm (e.g. the first transmission arm) is connected at a first part thereof with the reference body and with a second part thereof with the sensing transducer, is that this allows for a design wherein the number of hinges required in the optical sensor device may be minimized. The minimum amount of hinges required in the optical sensor device is two hinges (one at the first part of the base and one at the second part of the base). In general, each hinge adds undesirable stiffness of the overall device. Furthermore, hinges dissipate energy during motion of the parts of the device in response to an input action that can result in hysteresis in the sensor performance. Therefore, a device in accordance with the present invention wherein the number of hinges is kept down to a minimum is advantageous over other designs.

Yet a further advantage of the present invention is that by connecting the base of the at least one transmission arm (e.g. the first transmission arm) at a first part thereof with the reference body and with a second part thereof with the sensing transducer, allows for an arrangement of components which is such that cross-axis sensitivity is down to a minimum. Cross-axis sensitivity is the sensitivity of the optical sensor device to an input action that is not aligned with the preferred axis of the devices for receiving an input action.

For example, an accelerometer may be designed for detecting vibrations aligned with a specific direction. To detect vibrations in all directions, three of such accelerometer having their input axes arranged orthogonal to each other (e.g. x, y, z direction) may be applied. Considering the z-axis aligned accelerometer, this accelerometer preferably only responds to vibrations in the z-direction. Cross-axis sensitivity is the sensitivity of the system to an input action that is not aligned with the preferred direction for receiving input. Thus in the case of the above z-axis aligned accelerometer, cross-axis sensitivity would be the sensitivity of the accelerometer to vibrations aligned with the x- or y-direction.

In the present invention, connecting the transmission arm at its base with both the reference body and the sensing transducer for example allows the positioning of the base in close proximity or even in between the reference body and the sensing transducer. Weight of the arm may be concentrated near the base, as it is in this part of the transmission arm where most mechanical stress is concentrated. Hence, this arrangement thus allows reduction of cross-axis sensitivity of the system by proper arrangement of the base of the arm relative to the reference body and sensing transducer.

In accordance with an embodiment, the optical fiber is connected with the second connecting part thereof to the reference body, or to an element which is fixed relative to the reference body. However, in yet a further embodiment of the present invention, the optical sensor device further comprises a second transmission arm having a base which is connected at a first part thereof with the reference body and with a second part thereof with the at least one sensing transducer, and wherein the optical fiber is connected with the second connecting part thereof at a location along the second transmission arm remote from said base, wherein the second transmission arm is arranged for converting the input action into a further sensing action applied to the optical fiber, such that upon receipt of the input action the further sensing action applied by the second transmission arm is applied in a different direction than the sensing action applied by the first transmission arm.

The second transmission arm in accordance with the present embodiment allows the input action received by the at least one sensing transducer to be converted into a sensing action in each of the first and second transmission arm that is applied to the optical fiber. The first transmission arm applies a sensing action to the first connecting part of the optical fiber, and a second transmission arm may apply as same but oppositely directed sensing action on the second connecting part of the optical fiber. Because a sensing action is applied responsive to the input action on either side of the optical fiber, the requirements on the sensing transducer become more flexible. For example, in an accelerometer for sensing vibrations, the sensing transducer may be formed by an inertial mass element. Applying the present embodiment with two transmission arms to the accelerometer, the length of the arms of each transmission arm may be half of the transmission arm length required in a single arm embodiment. This is particularly advantageous in implementations wherein the size of the optical sensor device must be as small as possible. Such embodiments may for example include implementation of accelerometer-type optical sensor devices inside a cable or another small sized form factor. Additionally, if symmetric arms of equal inertia are used, then the interfering cross-axis sensitivity of the system can be reduced significantly with respect to the single arm design as only actions of the arms in the opposite directions will generate a strain in the fiber.

A reduction in the length of the transmission arms further increases the resonance frequency of the optical sensor device, thereby (as explained hereinabove) increasing its operational frequency range. The optical sensor device thus becomes responsive to even higher frequencies. Moreover, reducing the length of the sensing transducer renders the design to be even smaller and more compact, and provides more design freedom in the mechanism layout.

In an embodiment of the present invention, for at least one of the first and second transmission arm, the connections with the sensing transducer and the reference body are formed of flexible hinges. These flexible material hinges may be sections of the arm thinned down (preferably with a circular profile) to minimize their rotational rigidity while maintaining sufficient strength to maintain their expected lifetime within the stresses expected in the application operation conditions. A further advantage of flexible hinges over other type of hinges, is the lower hysteresis of flexible hinges, being advantageous in an optical sensor device of the present invention.

In accordance with yet a further class of embodiments of the present invention, at least one of the first and second transmission arm comprises a shape such that in cross section a size of the at least one of the first and second transmission arm near the base thereof is larger than a size near said location for connecting the optical fiber. A design of a transmission arm having a broad base, or at least a base which is in cross section larger than the size in cross section near the connection with the optical fiber, provides for the transmission arm to have a low rotational inertia. Moreover, the broad base allows for a robust design in a location where the input action is conveyed from the sensing transducer onto the transmission arm.

In some of the embodiments of the above class, the frame thickness is non-uniform such that its thickness is decreased from the pivot mechanism point (where the detrimental stresses are the highest and the rotational inertia contributions are the lowest) towards the tip (where the bending stresses are the lowest but the inertial contributions would be the highest). In some other of these embodiments, the thickness decrease will be non-linear. In yet other of these embodiments, the width of the transmission arm is varied from a wide base to a narrow tip where the stresses are lowest. Yet in even other of these embodiments, the width change is non-linear such that the arm width is varied along its length, coupled with and in conjunction with its frame thickness, to obtain the highest rigidity to weight ratio arm wherein (intermediate) sections of the arm can be made wider albeit at lower thickness to achieve optimum performance.

In yet another embodiment of the present invention, at least one of the first and second transmission arm comprises a construction such that weight of the at least one of the first and second transmission arm is concentrated near the base thereof relative to said location for connecting the optical fiber. As will be appreciated, this provides similar advantages with respect to the rotational inertia of the system as in the previous class of embodiments. For example, the transmission arms may be designed to have a more heavy frame and a light middle section to achieve high rigidity and low cross-sectional weight. In a further embodiment the middle section can further encompass holes to further lower its weight with minimum rigidity loss.

In accordance with some embodiments, an input action which is received by the sensing transducer in a first direction will be converted via the first and/or second transmission arm in a sensing action which is in a same or opposite direction parallel to the first direction. In particular, this may for example be achieved by providing the first or second transmission arm having an angled longitudinal shape. In other words, along the length of the transmission arm, at some point transmission arm comprises an angle or bend towards a different direction. For example, a 90 degree angle at some point along the length of the transmission arm will cause the sensing action of the transmission arm applied to the optical fiber to be in the same direction as the direction of the input action received via the base.

An optical sensor device in accordance with the present invention may comprise, in accordance with one embodiment a reference body which is located in between a first and second sensing transducer. Alternatively, such an optical sensor device may comprise a single sensing transducer. For example, the sensing transducer may be arranged at least partly circumferential to the reference body, and at least partly enclosing the reference body such as to be adjacent to the reference body at least at two sides thereof. In this case, two transmission arms on either side of the reference body may be attached both to the reference body and to the sensing transducer, providing an embodiment wherein an input action receives by the sensing transducer results in the transmission arms to be moving in opposite directions and by equal amounts.

In accordance with some embodiments, the sensing transducer is arranged for receiving a dynamic input action, such as a vibration, acceleration or acoustic action. Typical embodiments may for example include a microphone, a hydrophone or a seismic sensor. In accordance with yet other embodiments, the sensing transducer may be arranged for receiving static input actions, such as a pressure or static force action.

Moreover, the optical fiber of the optical sensor device may comprise at least one of an input or output for receiving or transmitting an optical signal. Alternatively, a laser unit or laser element may be comprised by the optical sensor device for lighting the optical fiber. In addition, an optical output signal from the optical fiber may be received remotely from the optical sensor device, or the optical sensor device may itself comprise an interrogation unit or electronic device for interpreting the optical signals from the fiber. For example, an interferometer or a spectral analyzer.

In accordance with a further embodiment of the invention, the sensing transducer comprises at least one element of a group comprising: an inertial mass such as to provide an accelerometer, a deformable body such as to provide a pressure sensor. The invention is not limited to these types of sensing transducers.

Preferably, in accordance with another embodiment of the invention, at least the reference body, the at least one of the first and second transmission arm, and the sensing transducer are integrally formed of a same material such as to form a monolithic body. The use of flexible hinges, in accordance with embodiments described hereinabove, enables to form the transmission arm (or transmission arms in embodiments comprising two transmission arms) with both the reference body and the sensing transducer (e.g. in the form of an inertial mass). The term 'monolithic body' as applied herein refers to the element consisting of or constituting a single unit, i.e. cast as a single piece formed or composed of a single material (which may include any suitable material, e.g. a metal, a polymer, a composite material, etc.).

In accordance with a second aspect of the present invention, as provided a sensor apparatus comprising one or more sensor devices according to the first aspect, for sensing one or more input actions applied in one or more directions. For example, a typical embodiment may be in the form of a cable comprising three optical sensor devices in accordance with a first aspect. Each of the three optical sensor devices forms an accelerometer for sensing vibrations in three directions (x, y, z).

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIGS. 5A and 5B schematically illustrate an arrangement of optical sensor devices for implementation in a cable;

FIG. 8 schematically illustrates an optical sensor device in accordance with a further embodiment of the invention;

FIG. 9 schematically illustrates an optical sensor device in accordance with a further embodiment of the invention.

DETAILED DESCRIPTION

Fiber optic sensing schemes are considered ideal for high speed high accuracy detection of various effects, owing to the high bandwidth characteristics of optical fibers and rapid and accurate switching capabilities of (semiconductor) lasers. As such, many new generation dynamic sensors are based on fiber optic sensors.

Sensitivity and operation (frequency) bandwidth are two of the main performance criteria for dynamic (fiber optic) sensors. The operation bandwidth of (fiber optic) sensors are often limited by the mechanical resonance frequency of the transducer assembly as it is highly desirable to operate the sensors at frequencies significantly below resonance frequency. As such, there exists a need to push the resonance to higher frequencies as much as possible while maintaining sufficient sensitivity. However, added inertia and decrease of system rigidity are both factors that lower the resonance frequency undesirably.

Transmission arms can be used in tuning the achievable resonance frequency and sensitivity in dynamic sensors, whereby a pivoting arm amplifies the sensitivity or the resonance frequency depending on the arrangement. As the lengths between each of the active points (locations where force is applied to the arm) and the pivot points (namely L1 and L2; see for example the transmission arm 10 in FIG. 1 for which L1 and L2 have been indicated) become significantly different (e.g. T>10 or T<0.1), the desired benefits of the transmission arm truly emerge. However, as the transmission ratio (T=L1/L2) becomes much different than unity (T=1), several challenges emerge. One such issue is that the longer side of the arm starts becoming too weak in rigidity with respect to the forces it needs to transmit such that bending in the arm (which is a direct loss of transmission efficiency) starts to become an issue. Efforts to strengthen the arms results in the arm becoming significantly heavy whereby its rotational inertia can begin to be a significant contributor to the system and as such lower the resonance frequency and the operation bandwidth of the sensor. Furthermore, material properties and manufacturing issues limit the attainable rigidity in small form factor which is highly desirable for integrated sensors. The invention is directed at a design of a high-rigidity, low-inertia, miniscule force transmission arm, particularly—but not exclusively—for use in dynamic sensors.

Figure 1A:
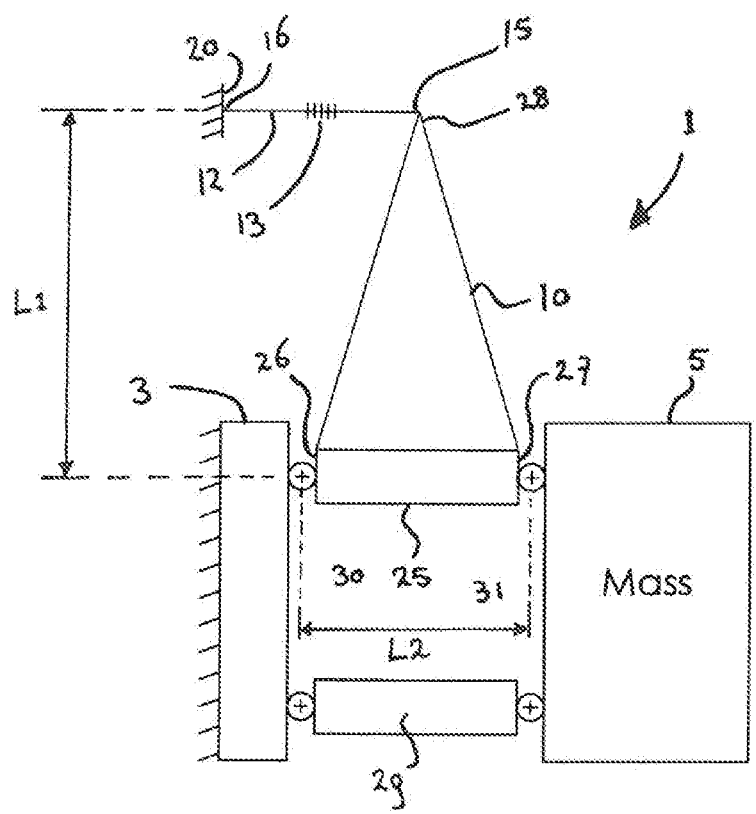
FIGS. 1A and 1B schematically illustrate an optical sensor device in accordance with a first embodiment.

A schematic illustration of the first embodiment of the present invention is provided in FIG. 1A. FIG. 1A discloses an optical sensor device 1. The optical sensor device 1 comprises a reference body 3 functioning as a fixed reference within the sensor device. The device 1 further comprises an inertial mass functioning as sensing transducer 5, and sensitive to receiving vibrations as an input action for performing geological survey. Usually, the sensing transducer is sensitive to receiving vibrations in a single direction. Therefore, in most applications wherein vibrations in three directions (x, y, z) are to be detected, an arrangement of optical sensor devices 1 may be required wherein each optical sensor device is sensitive to receiving input actions in one of three orthogonal directions. As will be further explained in relation to FIG. 1B below, upon receiving an input action the sensing transducer 5 will move relative to the fixed reference body 3.

The sensing transducer 5 is connected to the reference body 3 via connections that ensure that sensing transducer 5 (e.g. a mass) is not moving in all sorts of directions but is guided to move parallel to reference body 3. In FIG. 1 there are two connections illustrated. The connections between the sensing transducer 5 and the reference body 3 include at least a first transmission arm 10. A transmission arm 10 comprises a base 25. The base 25, at a first part 26 thereof, is connected via a hinge or pivotable connection 30 to the reference body 3. Moreover, the base 25 at a second side 27 thereof is connected via a similar pivotable connection 31 to the sensing transducer 5. A further connection 29 connects the sensing transducer 5 with the reference body 3. Along the length of the first transmission arm 10, at location 15 at the end of the first transmission arm 10, the transmission arm 10 is connected to an optical fiber 12. The optical fiber 12 comprises a fiber bragg grating 13 (FBG). The optical fiber 12 is connected with a first connecting part 15 to the first transmission arm 10 at location 28 thereof. The optical fiber 12 is connected with a second connecting part 16 to an element 20 external to the first transmission arm 10. For example, the element 20 to which the optical fiber 12 is connected at the second connecting part 16 may be an element that is fixed with respect to the fixed reference body 3. For example, element 20 may be an integral part of the reference body 3 or may be an element which is fixed thereto, using fixing means (e.g. screw).

Figure 1B:
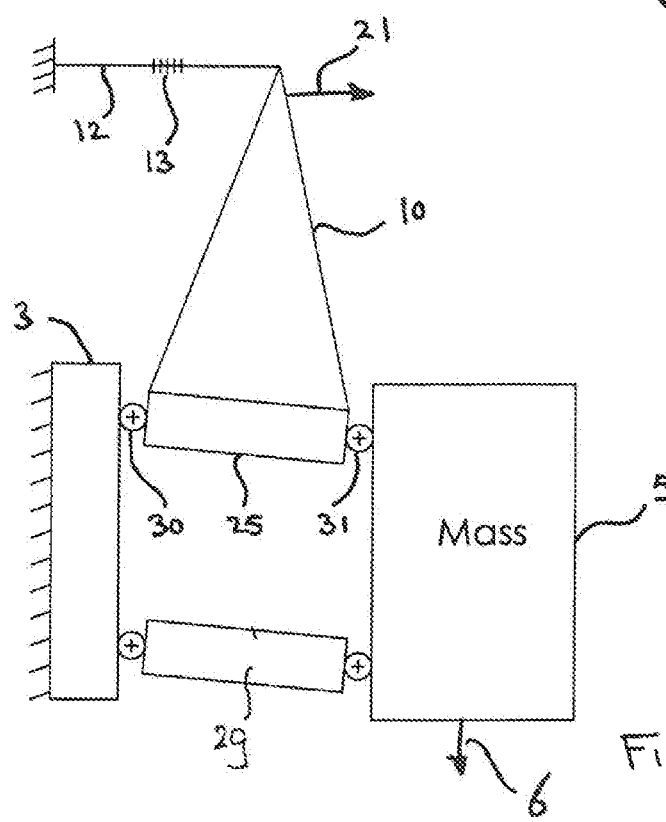

In FIG. 1B, an input action 6 is received by sensing transducer 5. Sensing transducer 5 will slightly move downwards relative to reference body 3 in response to the input action 6. By means of the pivotable connections 30 and 31, the first transmission arm 10 will pivot around pivotable connection 30. This results in a sensing action 21 exerted on the fiber 12. Because the fiber 12 is fixed to element 20, this results in a force being exerted on the fiber 12 which will stretch the optical fiber 12. The stretching of optical fiber 12 will change the geometric periodicity of the refractive index variations of the fiber bragg grating 13. This will result in a variation of the reflected wavelength of the FBG 13. Although in this schematic illustration of FIG. 1B an input and output for receiving and transmitting an optical signal is not illustrated, in reality the optical fiber 12 will be lit using an optical signal. The reflected wavelength (or the absence thereof in the transmitted part of the optical signal) can be detected using a spectral analyzer or interferometer. The reflected wavelength will be an indication of the amount of stretching, and therefore of the input action received by the sensing transducer 5.

The forces resulting from motion of the sensing transducer relative to the reference body are conveyed into the transmission arm via the connection at the base. The connecting first and second part of the base, connecting respectively to the reference body and the sensing transducer, are arranged close to each other (making distance L1 small). The base of the arm has mechanical stiffness resulting from the longitudinal shape of the arm, and is therefore robust. This is advantageous with respect to rigidity at the input. Across its length, the arm can be fully optimized in terms of rotational inertia and rigidity with respect to the forces applied at the optical fiber connection. Moreover, the close proximity of the connections at the base (the first and second part), allows the arm to be smaller in length for obtaining a same transmission ratio T. This further contributes to lowering the inertia of the system.

Figure 2A:
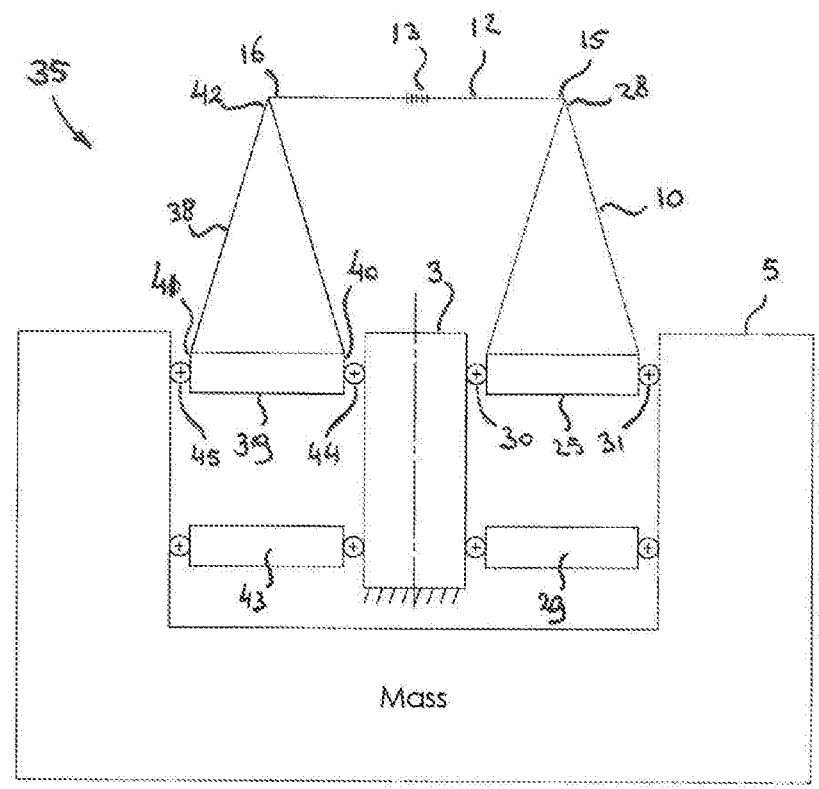
FIGS. 2A and 2B schematically illustrate an optical sensor device in accordance with a second embodiment.

A further embodiment of the present invention is schematically illustrated in FIG. 2A. In FIG. 2A, the optical sensor device 35 includes a first transmission arm 10 and a second transmission arm 38. Again, the optical sensor device 35 includes a sensing transducer 5 in the form of an inertial mass, just like in the embodiment of FIGS. 1A and 1B. The fixed reference body 3 is arranged in between the first transmission arm 10 and the second transmission arm 38. The first transmission arm 10 comprises a base 25 and is connected via pivotable connections (e.g. flexible hinges) 30 and 31 respectively to the reference body 3 and the inertial mass 5. The sensing transducer 5 is further connected to the reference body 3 along a second connection 29. Likewise, the second transmission arm 38 comprises a base 39. The base 39 of the second transmission arm, in a first part 40 thereof, comprises a pivotable connection 44 with the reference body 3. The base 39 of the second transmission arm 38 in a second part 41 thereof comprises a pivotable connection 45 with the inertial mass 5 forming the sensing transducer. An additional connection 43 further connects the sensing transducer 5 and the reference body 3. As follows from the schematic illustration of FIG. 2A, the sensing transducer 5 is circumferentially arranged around the reference body 3 such as to be adjacent to the reference body 3 on either side thereof. The connections between the inertial mass 5 and the reference body 3 amongst others include the first transmission arm 10 and the second transmission arm 38 via their basis 25 and 39 respectively. An optical fiber 12 including a fiber bragg rating 13 is connected in a first connecting part 15 thereof to the first transmission arm 10 at location 28 along the length of the first transmission arm 10. The fiber 12 at a second connecting part 16 thereof is connected to the second transmission arm 38 at location 42 along the length of the second transmission arm. So, instead of being connected to a fixed reference element, in the embodiment of FIG. 2A a second connecting part 16 of the optical fiber 12 is connected to a second transmission arm 38.

Figure 2B:
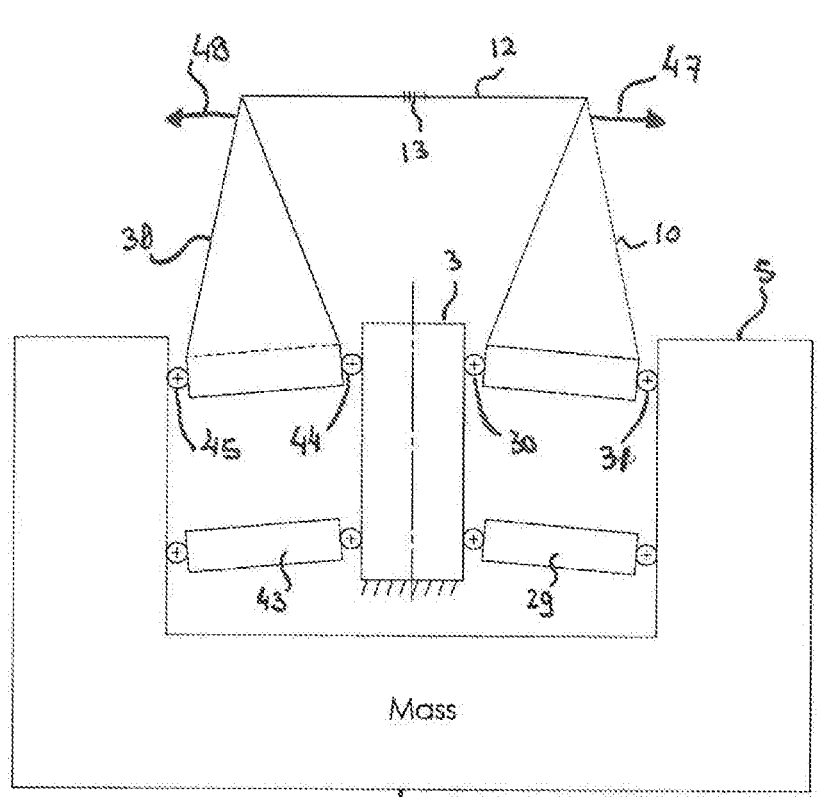

Operation of the embodiments of FIG. 2A is schematically illustrated in FIG. 2B. As follows from FIG. 2B, an input action 6 received by the sensing transducer 5 moves the inertial mass 5 downward relative to the fixed reference body 3. As a result of the pivotable connections 30, 31, 44 and 45, the first transmission arm 10 and the second transmission arm 38 will pivot in response to the movement of the sensing transducer 5 relative to the reference body 3. First transmission arm 10 will pivot around pivotable connection 30 with the reference body 3. Second transmission arm 38 will pivot around pivotable connection 44 with the reference body 3. This results in sensing actions 47 and 48 to be exerted to the optical fiber 12. As a result of the symmetric design with the fixed reference body 3 in the middle and the first transmission arm 10 and the second transmission arm 38 on either side, enclosed by the circumferential sensing transducer 5, first transmission arm 10 and second transmission arm 38 will pivot in opposite directions. As a result, the sensing action 47 is parallel but in opposite direction to the sensing action 48. Because in the embodiment of FIGS. 2A and 2B an input action 6 is converted into a double sensing action 47 and 48 in opposite directions applied to the optical fiber 12, sensitivity of the system to vibrations is increased. In fact, the length required for the transmission arms 10 and 38 may be half of the transmission arm length required for detecting the same vibration with the embodiment of FIGS. 1A and 1B. The lower arm length renders the sensor device to be more compact. It further increases the resonance frequency of the system, thereby increasing the operational frequency range of the sensor.

Figure 3:
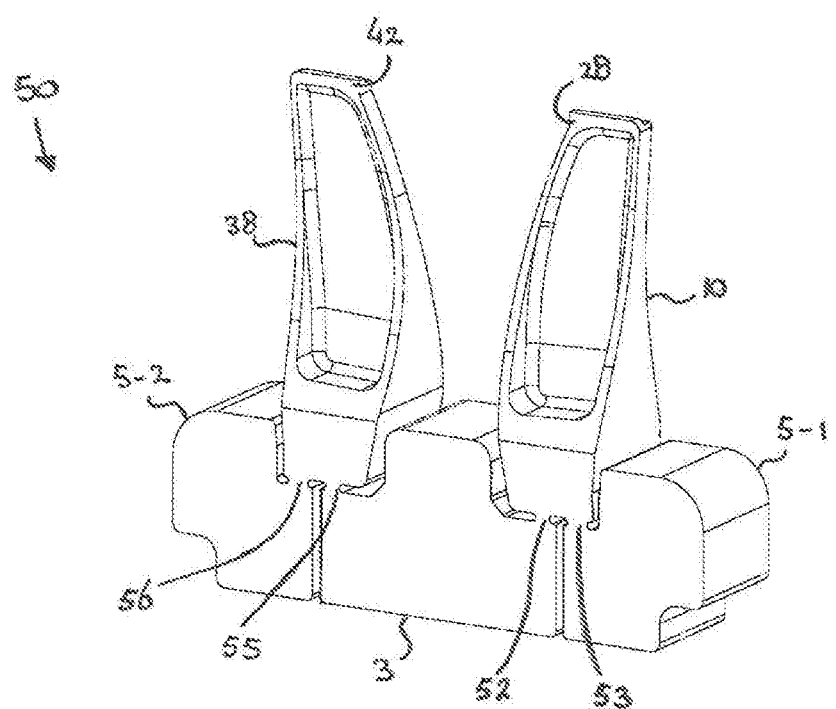
FIG. 3 illustrates an optical sensor device in accordance with an embodiment of an invention.

A further embodiment of the present invention is illustrated in FIG. 3. FIG. 3 illustrates the design of a monolithic body for implementation in an optical sensor device in accordance with the present invention. The monolithic body 50 consists of sensing transducers 5-1 and 5-2. A reference body 3 is arranged in between the sensing transducers 5-1 and 5-2. A first transmission arm 10 and a second transmission arm 38 respectively connect the reference body 3 with the first sensing transducer 5-1 and the second sensing transducer 5-2. The pivotable connections between the first transmission arm 10 and the sensing transducer 5-1 are formed by a flexible hinge 53, whereas the connection between the first transmission arm 10 and the reference body 3 is formed by flexible hinge 52. Likewise, the connection between the second transmission arm 38 and the reference body 3 are formed by flexible hinge 55, and the connection between the second transmission arm 38 and the second actuator 5-2 is formed by flexible hinge 56.

The flexible hinges 52, 53, 55 and 56 are formed of thinned sections between the respective transmission arms 10 and 38 and the respective parts 5-1, 3, and 5-2. The thinned sections of the material from which monolithic body 50 is formed preferably comprise a circular profile, such as is indicated in FIG. 3. The thinned sections minimize rotational rigidity of the material while maintaining sufficient strength to maintain operational during the expected lifetime of the optical sensor device within the stresses expected during the operation conditions thereof.

FIG. 3 further illustrates the locations 28 and 42 on the first transmission arm 10 and the second transmission arm 38 where the optical fiber including a fiber bragg grating will be fixed to the transmission arms 10 and 38 in the optical sensor device.

Figures 4A, 4B:
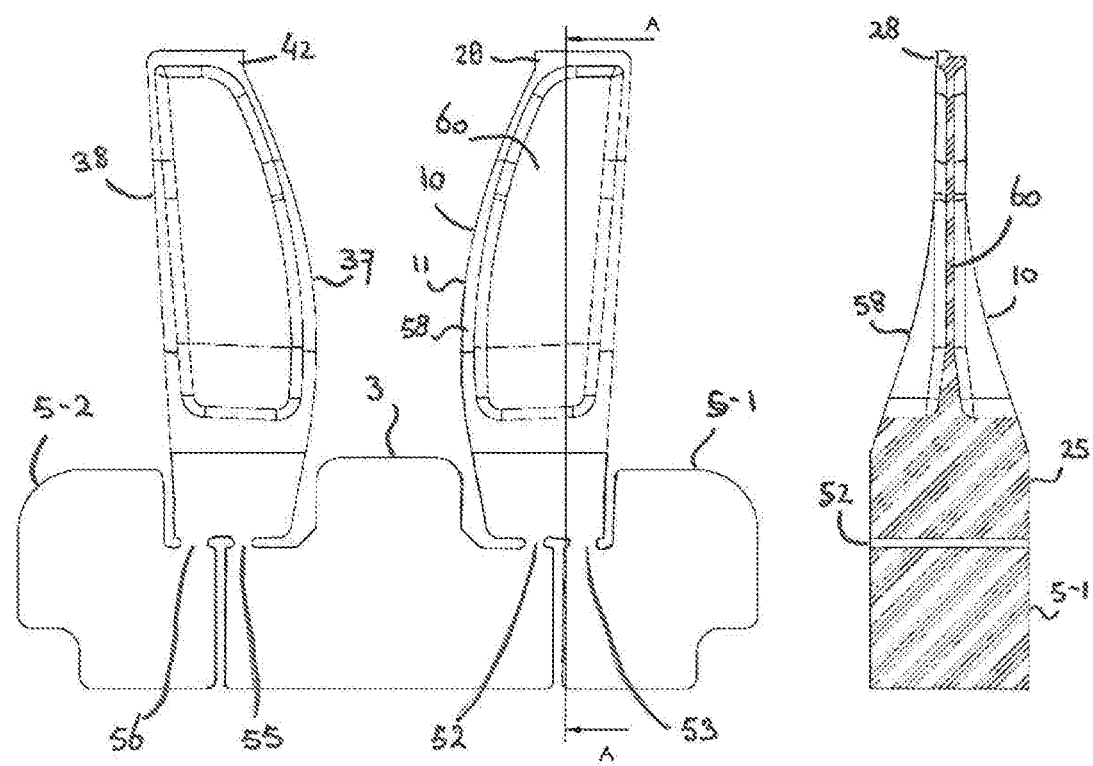
FIGS. 4A and 4B provide a front and cross sectional side view of the embodiment of FIG. 3.

FIGS. 4A and 4B respectively provide a front view (FIG. 4A) and a cross-sectional view (FIG. 4B) of the monolithic body 50 of FIG. 3. The respective parts of the monolithic body described hereinabove have been indicated in FIG. 4A and FIG. 4B with their corresponding reference numerals. FIG. 4B presents a cross section across a line A-A illustrated in FIG. 4A. As follows clearly from the front view illustrated in FIG. 4A, side 11 of the first transmission arm 10 and side 37 of the second transmission arm 38 slightly bend inward.

As follows from FIG. 4A and FIG. 4B, first transmission arm 10 comprises a thick and broad base 25, while the extension of the first transmission arm 10 towards location 28 is much thinner, comprising a thin section 60 having a rim 58. The construction of the thin section 60 with the rim 58 provides sufficiently high rigidity to the transmission arm 10, while having a low cross sectional weight. As a result of the design illustrated in FIGS. 4A and 4B for the first transmission arm 10, most of the weight of the transmission arm 10 is concentrated at the base 25 of the transmission arm 10 (close to the pivot point formed by flexible hinge 52). The frame thickness of the first transmission arm 10 is thereby non-uniform in such a way that its thickness is decreased from the pivot point 52 towards the location 28 where the fiber is connected. This is advantageous because near the pivot point 52, the detrimental stresses are the highest while contributions of mass to the rotational inertia are the lowest at this point. At the same time, at location 28 the bending stresses are the lowest, while the inertial contribution of any mass would be the highest. In the design of FIGS. 3 and 4A and 4B, the first transmission arm 10 comprises a wide middle section obtained by the inward bending side 11 of the arm 10 such as to obtain the highest rigidity at low thickness, to achieve optimal performance of the transmission arm 10. In a preferred embodiment, the design of the second transmission arm 38 of monolithic body 50 is identical (although in mirror image) to that of the first transmission arm 10. The identical (mirror imaged) design allows for balanced transmission and elimination of undesired (interfering) cross-axis sensitivity that may arise since any inertial (vibrational) effects in the for example direction parallel to the fiber in FIG. 4A will not result in length change in the fiber. FIGS. 5A and 5B illustrates a longitudinal sensor apparatus, comprising an arrangement of two optical sensor devices assembled such as to enable the detection of vibrations in two orthogonal directions 76 and 79. The arrangement 65 consists of a first optical sensor device 70 and a second optical sensor device 71. The first optical sensor device 70 is arranged for measuring vibrations in the direction 76. The second optical sensor device 71 is arranged for measuring vibrations in the direction 79. The first optical sensor device 70 consists of a monolithic body 75 of a design similar (but not identical) to that illustrated in FIG. 3. The monolithic body 75 comprises two transmission arms connecting at their ends to a fiber bragg grating (not visible). The sensing transducers of the monolithic body 75 are fixed to an inertial mass 88 (which is only visible in FIG. 5B, and has been left out in FIG. 5A to reveal the monolithic body). Likewise, optical sensor device 71 comprises a monolithic body 78 comprised of two transmission arms that connect at their ends to a fiber bragg grating 80. The sensing transducers of monolithic body 78 are connected to mass 89 illustrated in FIG. 5B. The arrangement 65 further comprises signal in/output 82. For example, the in/output 82 allow the reception of further optical fibers that may be coupled to the end points of the fiber bragg gratings attached between the transmission arms of each of the monolithic bodies 75 and 78. This enables to light the fiber bragg gratings with an optical signal, while the reflected wavelength can be received on the return path of the optical fiber.

FIGS. 5A and 5B illustrate an open section 85 of the arrangement wherein a further optical sensor device may be installed for detecting vibrations in a third orthogonal direction. Such a further optical sensor device is for example illustrated in FIG. 6, and explained below. Altogether, the arrangement of optical devices such as is illustrated in FIGS. 5A and 5B, for example completed with a third optical sensor device as is illustrated in FIG. 6 allow the installation of such an optical sensor arrangement in a cable that may be used for geological survey at sea (e.g. submarine cable) or at land, or a cable that may be lowered into a borehole or oil well, or installable onto a bridge, a building or other structure for examination or monitoring purposes.

Figure 6:
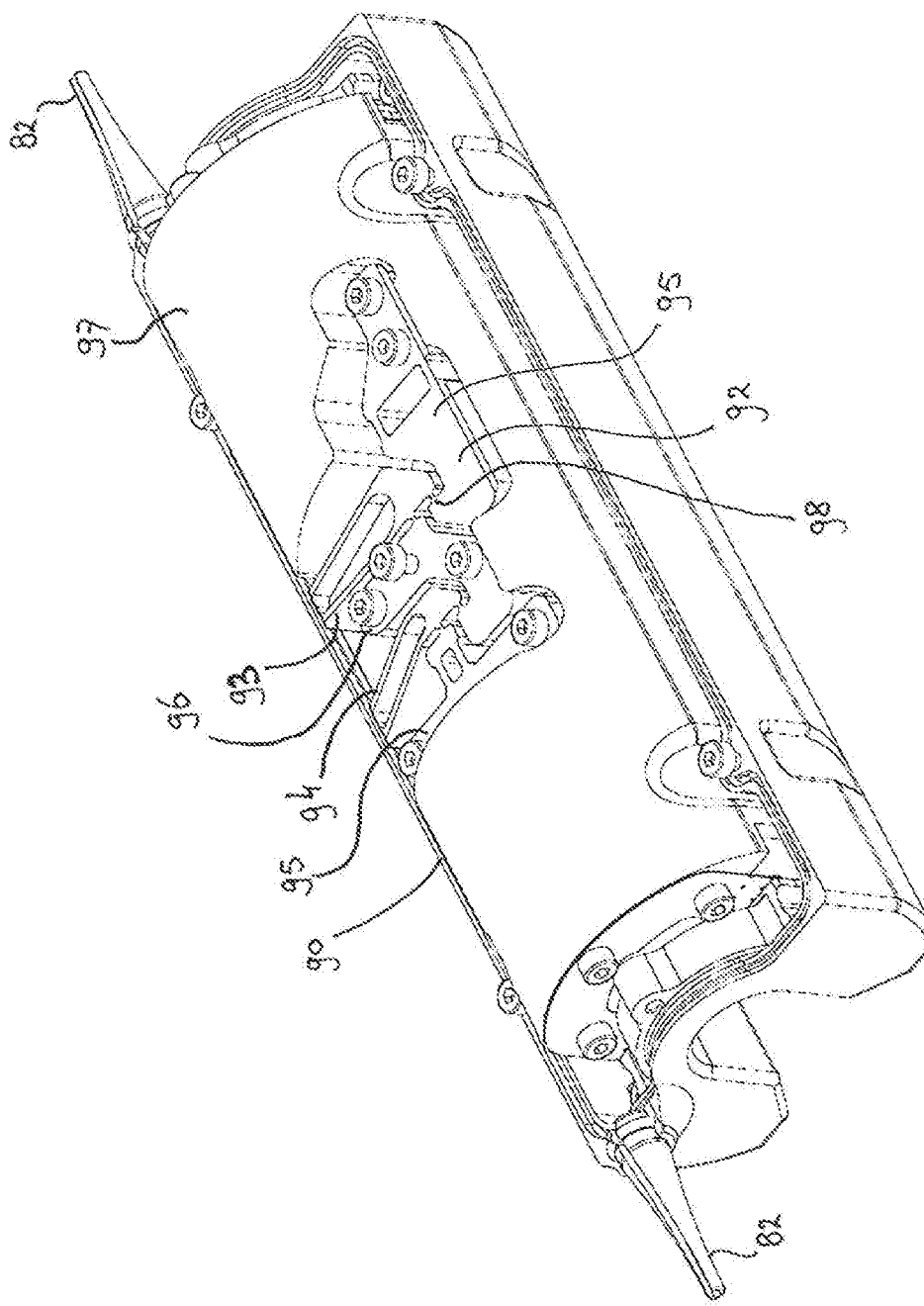
FIG. 6 illustrates a further optical sensor device that may be implemented in the arrangement of FIGS. 5A and 5B.

A further optical sensor device in accordance with the present invention is illustrated in FIG. 6. In FIG. 6, the typical arrangement of first and second transmission arm, reference body, and sensing transducers is different because in the embodiment of FIG. 6, the direction of the vibrations to be detected are in the same direction as the stretching of the fiber performed by the transmission arms. The optical sensor device 90 illustrated in FIG. 6 thereby forms an in-line optical sensor device for detecting vibrations in-line with the fiber direction.

In FIG. 6, optical sensor device 90 comprises a monolithic body 92 comprising two sensing transducers 95. The sensing transducers 95 are connected to an inertial mass 97 and are movable relative to the fixed reference body 96 of the monolithic body. Flexible hinges, such as flexible hinge 98, connect each of the sensing transducers 95 with the fixed reference body 96 via the respective first and second transmission arms 93 and 94. The sensing transducers 95 are connected to the first transmission arm 93 and second transmission arm 94 in such a manner that upon a vibration exerted on the inertial mass 97, the transmission arms 93 and 94 will pivot in opposite directions. This will cause a stretching or compression of the optical fiber containing FBG in between the arms 93 and 94. By connecting the optical sensor device 90 to the arrangement in FIGS. 5A and 5B in the section which is generally indicated by reference numeral 85, a longitudinal cylindrical arrangement will be obtained that allows to be implemented inside a submarine cable.

Figure 7:
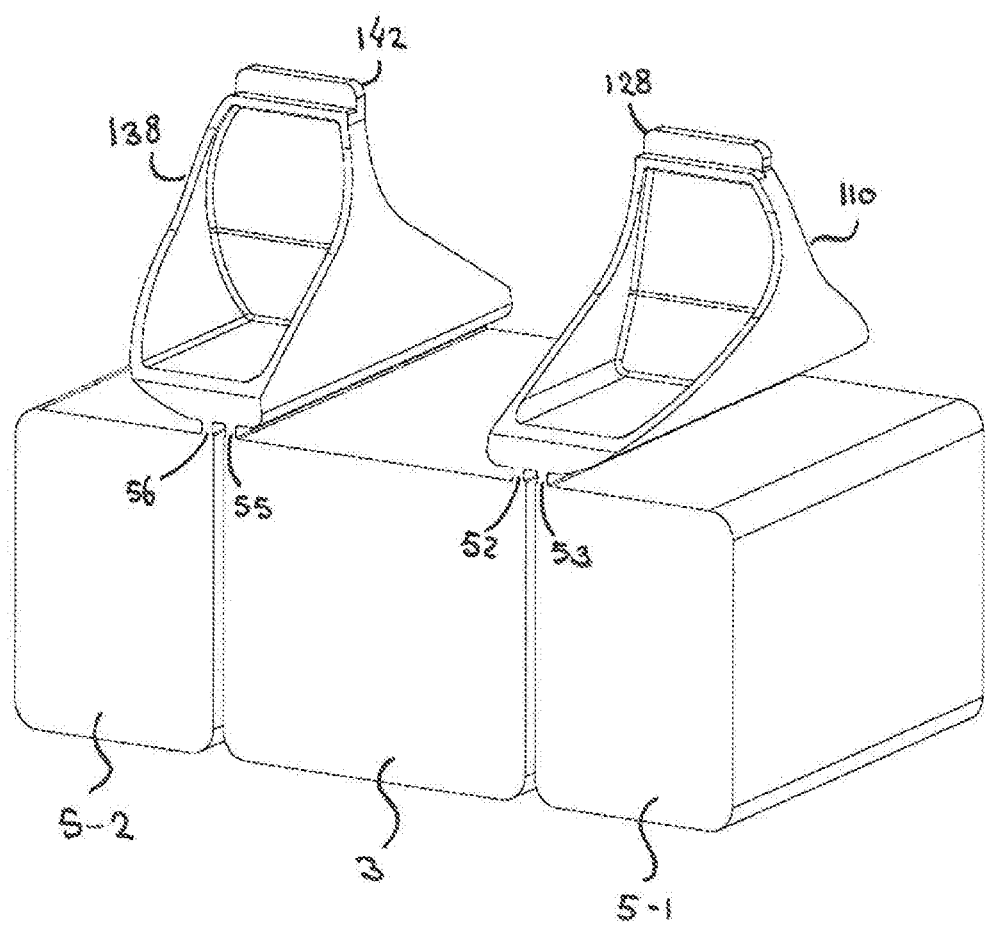
FIG. 7 illustrates a further embodiment of a monolithic body type optical sensor device in accordance with the present invention.

FIG. 7 illustrates a further monolithic body that can be used in an optical sensor device in accordance with the present invention. The design is similar to that of FIG. 3, however the first transmission arm 110 and the second transmission arm 138 are shaped such as to bend outward instead of inward. Moreover, the arms 110 and 138 are shorter and wider. Locations 128 and 142 on first transmission arm 110 and second transmission arm 138 respectively illustrate the locations where the optical fiber including the FBG can be installed. Operation of the monolithic body of FIG. 7 inside an optical sensor device is similar to operation of monolithic body 50 illustrated in FIG. 3.

The use of a monolithic body design for the optical sensor device of the present invention provides for several advantages. For example, already at manufacturing, at is advantageous to manufacture the component from one piece of material, including flexible hinges. Moreover, the monolithic body has more stability and is more compact in design. These advantages result in operational advantages as described hereinabove.

A further embodiment of the optical sensor device of the present invention is schematically illustrated in FIG. 8. This embodiment relates to a pressure sensor device 155. The sensor device 155 is in many ways similar to the one arm optical sensor device illustrated in FIGS. 1A and 1B. Therefore, elements of this embodiment performing a same or similar function within the device have been indicated in FIG. 8 having identical reference numerals as in FIGS. 1A and 1B and are not further described or explained here. The main difference between the embodiment of FIGS. 1A and 1B and that of FIG. 8 is in the sensing transducer 5. The sensing transducer 5 is supported by a bellows 150 mounted on a fixed reference surface 152. The sensing transducer is arranged for receiving a pressure force P (arrow 156) in a direction aligned with the axial direction through the bellows 150. This results in a sensing action 21 in the transmission arm 10. Instead of being a pressure sensor, the sensor device 155 may as well be applied as a weight sensor. A two-armed embodiment for pressure sensing is schematically illustrated in FIG. 9. Here, the optical sensor device 156 has it's sensing transducer 5 arranged between the reference body parts 3-1 and 3-2 and the arms 10 and 38. The sensing transducer 5 is supported by bellows 150 mounted on the fixed surface 152. The fixed surface 152, and the reference body 3 (or 3-1 and 3-2) in FIGS. 8 and 9 may be separate parts or may be different parts of one and the same reference body. In one preferred application, the invention of FIG. 8 can also be used as a dynamic pressure sensor (such as a microphone or hydrophone) for detection for example acoustic signals as it will have a wide operation frequency range. In the case of for example hydrophone application, the invention can be enclosed in a housing filled with material (for example gel) that matches the acoustic impedance of the sensor to the environment (for example water).

As described already above, the optical sensor device of the present invention provides an optimal design wherein input action is amplified well into variations in strain in the FBG, while allowing fast response of the device to fast changes in the input action. In terms of sensing dynamic parameters, a lower rotational inertia results in the resonance frequency of the system to shift to higher frequencies. Hence, because the upper limit of the operational frequency range of the device is determined by the resonance frequency (the upper limit must be well below the resonance frequency), the low inertia design of the present invention provides an optical sensor device having a broad operational frequency range. The sensor device is thus responsive to high frequencies. For example, using the teachings of the invention, an optical sensor device may be obtained having an operational frequency range of up to 1000 Hz typically. However, by applying the monolithic body design of the present invention, wherein the reference body, the at least one of the first and second transmission arm, and the sensing transducer are integrally formed of a same material (e.g. using flexible material hinges), an operational frequency range of up to 2000 Hz is achievable. For specific embodiments requiring a very high sensitivity (such as for implementation within a cable), an operational frequency range of up to 200 Hz is thus obtainable without difficulty.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. An optical sensor device comprising:
    a reference body and at least one sensing transducer, wherein the sensing transducer is arranged for receiving an input action and is movably arranged relative to the reference body for moving relative to the reference body in response to the input action;
    an optical fiber and one or more transmission arms, wherein the optical fiber comprises an intrinsic fiber optic sensor and is connected with a first connecting part thereof to a first transmission arm of the one or more transmission arms and with a second connecting part thereof to an element exterior to the first transmission arm, the first connecting part and the second connecting part being on either side of the intrinsic fiber optic sensor,
    wherein the first transmission arm being connected at a first part thereof with the reference body and at a second part thereof with the sensing transducer, the optical fiber being connected at a location along the first transmission arm remote from a base of the first transmission arm thereby converting the input action received by the sensing transducer into a sensing action applied to the optical fiber to modify strain in the optical fiber dependent on the input action.

2. The optical sensor device according to claim 1, wherein the optical fiber is connected with the second connecting part thereof to the reference body or a further element fixed relative to the reference body.

3. The optical sensor device according to claim 1, further comprising a second transmission arm having a base connected at a first part thereof with the reference body and with a second part thereof with the at least one sensing transducer, and wherein the optical fiber is connected with the second connecting part thereof at a location along the second transmission arm remote from the base of the second transmission arm,
  wherein the second transmission arm is arranged for converting the input action into a further sensing action applied to the optical fiber, such that upon receipt of the input action the further sensing action applied by the second transmission arm is applied in a different direction than the sensing action applied by the first transmission arm.

4. The optical sensor device according to claim 1, wherein, for at least one of the one or more transmission arms, the connections with the sensing transducer and the reference body are flexible hinges.

5. The optical sensor device according to claim 1, wherein at least one of the one or more transmission arms comprises a shape such that in cross section a size of the at least one of the one or more transmission arms near the base thereof is wider than a size near the location for connecting the optical fiber.

6. The optical sensor device according to claim 1, wherein at least one of the one or more transmission arms comprises a construction such that weight of the at least one of the one or more transmission arms is concentrated near the base thereof relative to the location for connecting the optical fiber.

7. The optical sensor device according to claim 1, wherein the at least one sensing transducer is arranged for receiving the input action directed in a first direction, and wherein at least one of the one or more transmission arms is shaped such as to apply the sensing action in a direction transverse to the first direction.

8. The optical sensor device according to claim 1, wherein the at least one sensing transducer is arranged for receiving the input action directed in a first direction, and wherein at least one of the one or more transmission arms is shaped such as to apply the sensing action in a same or opposite direction parallel to the first direction.

9. The optical sensor device according to claim 8, wherein the at least one of the one or more transmission arm comprises an angled longitudinal shape.

10. The optical sensor device according to claim 1,
  wherein the reference body is located in between a first and second sensing transducer of the at least one sensing transducer.

11. The optical sensor device according to claim 1, wherein the at least one sensing transducer is shaped to at least partly enclose the reference body to be adjacent to the reference body at least at two sides thereof.

12. The optical sensor device according claim 1,
  wherein the at least one sensing transducer comprises an inertial mass to provide an accelerometer or a deformable body to provide a pressure sensor; and/or
  wherein the intrinsic fiber optic sensor comprises at least one of a fiber bragg grating, a fiber laser, or a multicore fiber.

13. The optical sensor device according to claim 1, wherein at least the reference body, the at least one of the first and second transmission arm, and the sensing transducer are integrally formed of a same material to form a monolithic body.

14. A sensor apparatus comprising:
  one or more optical sensor devices, the one or more optical sensors including:
    a reference body and at least one sensing transducer, wherein the sensing transducer is arranged for receiving an input action and is movably arranged relative to the reference body for moving relative to the reference body in response to the input action,
    an optical fiber and one or more transmission arms, wherein the optical fiber comprises an intrinsic fiber optic sensor and is connected with a first connecting part thereof to a first transmission arm of the one or more transmission arms and with a second connecting part thereof to an element exterior to the first transmission arm, the first connecting part and the second connecting part being on either side of the intrinsic fiber optic sensor,
    wherein the first transmission arm being connected at a first part thereof with the reference body and at a second part thereof with the sensing transducer, the optical fiber being connected at a location along the first transmission arm remote from a base of the first transmission arm thereby converting the input action received by the sensing transducer into a sensing action applied to the optical fiber such as to modify strain in the optical fiber dependent on the input action.

15. A cable comprising at least one of a longitudinal sensor, the longitudinal sensor including:
  a reference body and at least one sensing transducer, wherein the sensing transducer is arranged for receiving an input action and is movably arranged relative to the reference body for moving relative to the reference body in response to the input action,
  an optical fiber and one or more transmission arms, wherein the optical fiber comprises an intrinsic fiber optic sensor and is connected with a first connecting part thereof to a first transmission arm of the one or more transmission arms and with a second connecting part thereof to an element exterior to the first transmission arm, the first connecting part and the second connecting part being on either side of the intrinsic fiber optic sensor,
  wherein the first transmission arm being connected at a first part thereof with the reference body and at a second part thereof with the sensing transducer, the optical fiber being connected at a location along the first transmission arm remote from a base of the first transmission arm thereby converting the input action received by the sensing transducer into a sensing action applied to the optical fiber such as to modify strain in the optical fiber dependent on the input action.

16. The optical sensor device according to claim 3, wherein, for at least one the one or more transmission arms, the connections with the sensing transducer and the reference body are flexible hinges.

17. The optical sensor device according to claim 3, wherein at least one of the one or more transmission arms comprises a shape such that in cross section a size of the at least one of the one or more transmission arms near the base thereof is wider than a size near the location for connecting the optical fiber.

18. The optical sensor device according to claim 3, wherein at least one of the one or more transmission arms comprises a construction such that weight of the at least one of the one or more transmission arms is concentrated near the base thereof relative to the location for connecting the optical fiber.

19. The optical sensor device according to claim 3, wherein the at least one sensing transducer is arranged for receiving the input action directed in a first direction, and wherein at least one of the one or more transmission arms is shaped such as to apply the sensing action in a direction transverse to the first direction.

20. The optical sensor device according to claim 3, wherein at least the reference body, the at least one of the first and second transmission arm, and the sensing transducer are integrally formed of a same material to form a monolithic body.

* * * * *